(12) United States Patent
Ombach et al.

(10) Patent No.: US 9,461,512 B2
(45) Date of Patent: Oct. 4, 2016

(54) ELECTRIC MACHINE AND STEERING DEVICE

(75) Inventors: Grzegorz Ombach, Veitshoechheim (DE); Jacek Junak, Veitshoechheim (DE)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 769 days.

(21) Appl. No.: 13/636,404

(22) PCT Filed: Mar. 24, 2011

(86) PCT No.: PCT/EP2011/054537
§ 371 (c)(1),
(2), (4) Date: Dec. 18, 2012

(87) PCT Pub. No.: WO2011/117347
PCT Pub. Date: Sep. 29, 2011

(65) Prior Publication Data
US 2013/0214630 A1    Aug. 22, 2013

(30) Foreign Application Priority Data
Mar. 24, 2010   (DE) ................. 10 2010 003 217

(51) Int. Cl.
*H02K 3/00* (2006.01)
*H02K 3/28* (2006.01)
*H02K 21/16* (2006.01)
*H02K 21/00* (2006.01)

(52) U.S. Cl.
CPC ........ *H02K 3/00* (2013.01); *H02K 3/28* (2013.01); *H02K 21/00* (2013.01); *H02K 21/16* (2013.01)

(58) Field of Classification Search
CPC .......... H02K 3/28; H02K 21/00; H02K 3/00; H02K 21/16
USPC ................................ 310/179–210
See application file for complete search history.

(56) References Cited

U.S. PATENT DOCUMENTS

| 4,847,982 A | 7/1989 | Morrill |
|---|---|---|
| 7,408,281 B2 | 8/2008 | Kinashi |

(Continued)

FOREIGN PATENT DOCUMENTS

| DE | 102007029157 A1 | 1/2009 |
|---|---|---|
| EP | 1257040 A2 | 11/2002 |

(Continued)

OTHER PUBLICATIONS

Office Action in corresponding Korean application No. KR-10-2012-7027600, dated Sep. 2, 2013.

(Continued)

*Primary Examiner* — Naishadh Desai
(74) *Attorney, Agent, or Firm* — Manelli Setler PLLC; Edward J. Stemberger

(57) ABSTRACT

The present invention relates to an electric machine, in particular a brushless permanent magnet motor, provided with a rotor and a stator which has a plurality of teeth with winding phases provided thereon, wherein each winding phase has at least four windings, wherein, of the at least four windings of a winding phase, in each case two windings are connected in series with one another, and wherein these windings which are connected in series are connected in parallel. The present invention also relates to a steering device.

15 Claims, 5 Drawing Sheets

(56) References Cited

U.S. PATENT DOCUMENTS

| | | | |
|---|---|---|---|
| 2003/0052565 A1* | 3/2003 | Nickoladze et al. | 310/198 |
| 2004/0189242 A1* | 9/2004 | Pyntikov et al. | 318/721 |
| 2006/0022544 A1 | 2/2006 | Kinashi | |
| 2009/0140594 A1* | 6/2009 | Ogawa | H02K 3/28 310/195 |
| 2012/0248923 A1* | 10/2012 | Kimura et al. | 310/198 |
| 2013/0154428 A1* | 6/2013 | Sakuma et al. | 310/207 |

FOREIGN PATENT DOCUMENTS

| | | |
|---|---|---|
| EP | 1511155 A1 | 3/2005 |
| JP | 2006050690 | 2/2006 |
| JP | 2010193675 | 9/2010 |

OTHER PUBLICATIONS

English Translation of International Preliminary Report on Patentability & Written Opinion in PCT/EP2011/054537 dated Sep. 25, 2012.

International Search Report & Written Opioion in PCT/EP2011/054537 dated Mar. 23, 2012.

Office Action in DE 102010003217.4-32 dated Nov. 3, 2010.

Gottkehaskamp, R. Optimal gefertigt—Systematischer Entwurf von dreistrangigen Zahnspulenwicklugen burstenloser Motoren, Antriebstechnik Oct. 2007, S.30-35-ISSN 07228546.

Notice of Allowance in corresponding Korean application No. KR-10-2012-7027600, dated Mar. 27, 2014 and English translation.

* cited by examiner

ELECTRIC MACHINE AND STEERING DEVICE

BACKGROUND

The present invention concerns an electric machine and a steering device.

Such electric machines or electric motors are generally known and are, for example, used in steering drives of motor vehicle steering devices. Such an electric machine may, for example, be designed as a brushless permanent magnet motor having a stator and a rotor having magnetic poles, the stator having multiple-phase, e.g. three-phase, windings.

The stringent requirements of conditions of use in a motor vehicle, particularly in respect of as small an installation space as possible, low weight, a small number of components and a simultaneously high degree of efficiency with low noise emissions usually mean that compromises have to be made in respect of one or more of the aforementioned requirements. The persistent need emerges to provide an improved electric machine in respect of the above requirements.

SUMMARY

Against this background, the problem addressed by the present invention is therefore that of providing an improved electric machine in this respect.

The invention solves this problem by means of an electric machine having the features of claim 1 and/or by means of a steering device having the features of claim 9.

Accordingly, an electric machine is provided which has a rotor, a stator having a plurality of teeth with winding phases provided thereon, wherein each winding phase has at least four windings, wherein, of the at least four windings of a winding phase, two windings are connected in series in each case and wherein these windings which are connected in series are connected in parallel. Each winding phase has at least four windings, of which a first winding and a second winding are connected in series and are located on a first and of which a third winding and a fourth winding are connected in series and located on a second side opposite the first side. The two windings which are located opposite each other in the stator and connected in series are connected in series by cross-couplings and these series circuits are themselves connected in parallel by parallel connections such that one parallel connection connects the first winding and the third winding opposite, and the other parallel connection connects the second winding and the fourth winding opposite.

This method of arranging the windings (winding diagram) makes it possible for mechanical influences on the electric machine, and in this case particularly on its behaviour in operation, arising from parasitic effects of the mechanical tolerances of motor components (e.g. the rotor, stator and fittings), which tolerances are always present and which can usually only be avoided at exorbitantly high expense, to be reduced in a simple way.

Even a symmetrical phase load and a symmetrically induced phase voltage preferably arise, such that phase voltage symmetry is in a relatively low range of less than 0.3%, even in the presence of greater static eccentricities, e.g. of up to 0.3 mm.

The electric machine preferably even displays the same output as a conventional electric machine not modified in accordance with the invention.

Torque ripple, cogging torque and friction torque are also reduced, particularly at high speeds of the electric machine. Phase resistance is also low and noise can be advantageously reduced.

In general, an electric machine is thus provided which displays significantly improved electrical and mechanical properties in the same performance class.

Advantageous embodiments and developments of the invention emerge from the sub-claims and the description in combination with the figures of the drawings.

The two windings in the stator which are connected in series are preferably located opposite each other. This enhances phase compensation.

For this purpose, the two windings in the stator which are located opposite each other and connected in series can be offset from each other in the stator at angles of 150° or 210°.

In a further preferred embodiment of the electric machine, the stator has twelve teeth and the rotor ten poles. Alternatively, the number of poles of the rotor may also be fourteen.

In a typical embodiment, the winding phases are connected to each other by star and/or delta connections.

In a typical embodiment, the electric machine takes the form of a brushless permanent magnet motor.

A steering device of a motor vehicle is fitted with the above-described electric machine according to the invention.

The above embodiments and developments of the invention may be combined with each other in any suitable way, if this is expedient.

BRIEF DESCRIPTION OF THE DRAWINGS

The present invention is explained in more detail below with reference to the embodiments shown in the schematic figures of the drawings, in which.

In the absence of any statement to the contrary, like and functionally equivalent components are marked with the same reference numbers in the figures of the drawings.

DETAILED DESCRIPTION OF AN EXEMPLARY EMBODIMENT

Figure 1:
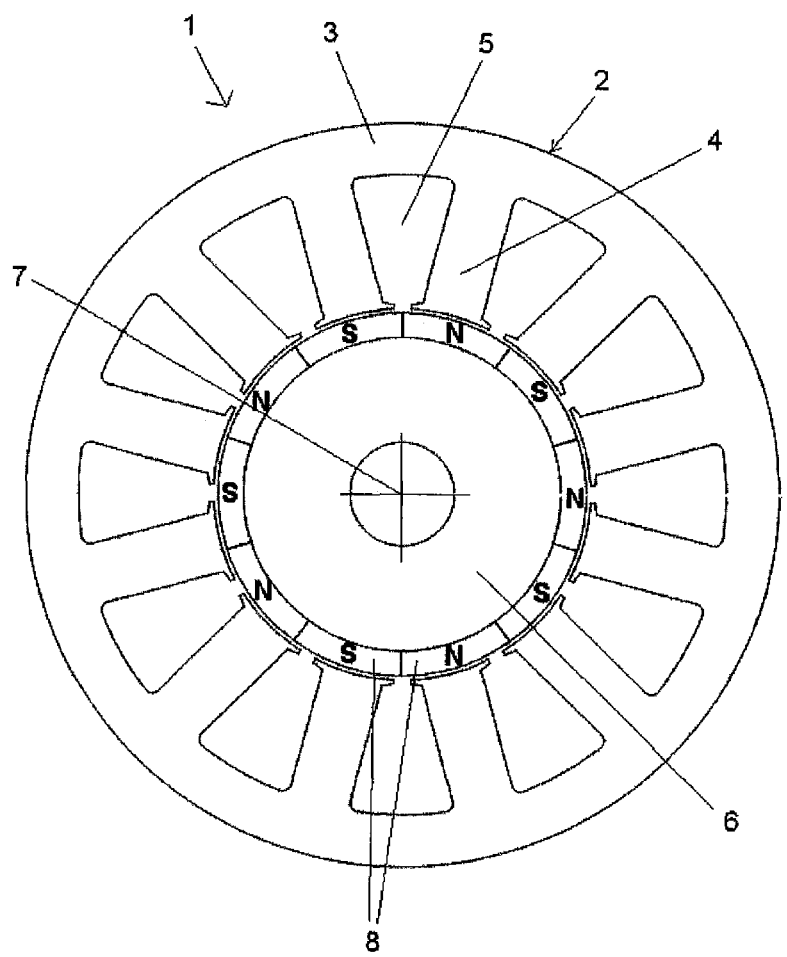
FIG. 1 is a schematic horizontal projection of an electric machine.

FIG. 1 is a schematic horizontal projection of an electric machine 1. In this case, the electric machine 1 is constructed as a brushless permanent magnet motor and has a stator 1 with a surrounding yoke 3, on which teeth 4 pointing radially inwards are mounted. Winding spaces 5 for windings around a tooth 4 are provided between said teeth 4, which are also referred to as single teeth, and these spaces will be described below. The teeth 4 surround a rotor 6, which is rotatably located about a rotor axis 7 inside the stator 2. The rotor 7 has magnets 8 with alternate magnetic poles N, S at its peripheral surface.

The number of teeth 4 of the stator 2 is twelve for this electric machine 1, whereby the angle between the teeth 4 being 30°. The number of poles of the rotor 6 arising from the number of magnets 8 is eight in this example.

Figure 2:
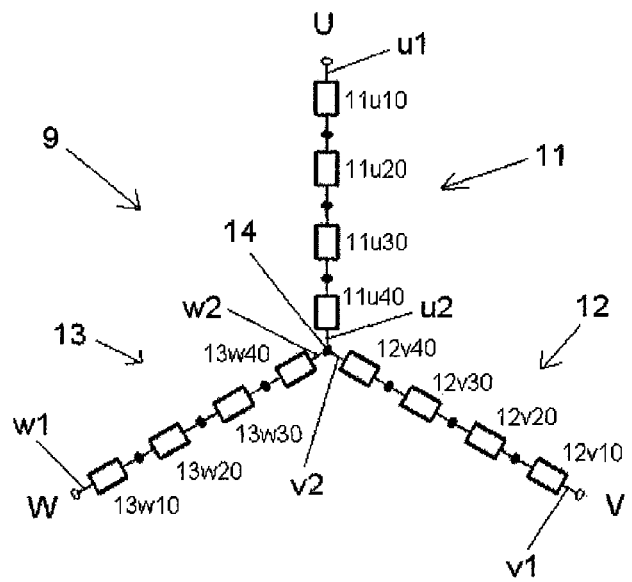
FIG. 2 is a circuit diagram of a star connection of windings of an electric machine.
Figure 3:
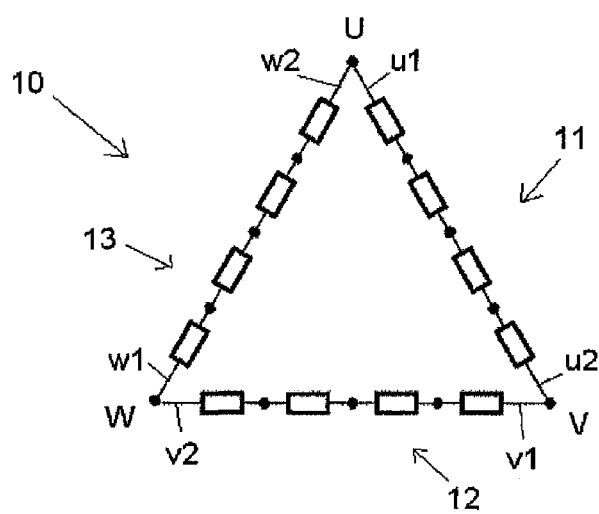
FIG. 3 is a circuit diagram of a delta connection of windings of an electric machine.

The windings of the stator 2 of the electric machine 1 may be connected and/or connectable in a star connection 9, shown in FIG. 2, or in a delta connection 10, in accordance with FIG. 3. Machine connection points are designated U, V and W.

In the star connection 9 in FIG. 2, a U winding phase 11 is connected to a phase connection point u1 at machine connection point U, a V winding phase 12 is connected to a phase connection point v1 at machine connection point V and a W winding phase 13 is connected to a phase connection point w1 at machine connection point W. The other phase connection points u2, v2 and w3 are interconnected, forming a star point 14. Each of these winding phases 11, 12, 13 has a series circuit of four individual windings in this case: the U winding phase 11 has U windings 11u10, 11u20, 11u30 and 11u40, the V winding phase 12 has V windings 12v10, 12v20, 12v30 and 12v40 and the W winding phase 13 has W windings 13w10, 13w20, 13w30 and 13w40.

The delta connection 10 according to FIG. 3 has the winding phases 11, 12, 13 described above in the delta connection, phase connection points u1 and w2 being connected to machine connection point U, phase connection points u2 and v1 being connected to machine connection point V and phase connection points v2 and w1 being connected to machine connection point W.

Figure 4:
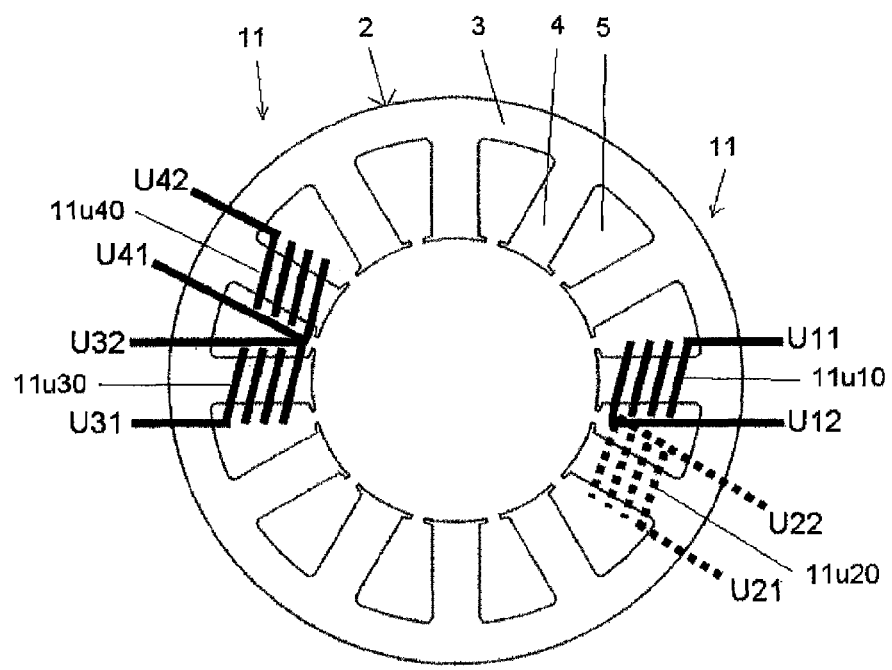
FIG. 4 is a horizontal projection of an electric machine with windings of a winding phase.

A layout of the individual windings of a winding phase 11, 12, 13 is described using the example of the U winding phase 11 in conjunction with FIG. 4, in a horizontal projection of the electric machine 1 (shown here without rotor 6).

In FIG. 4, a first U winding 11u10 is located on the right-hand side of the stator 2 around a tooth 4. A second U winding 11u20 is wound below it, offset at an angle of 30°. A third U winding 11u30 is located opposite the first U winding 11u10 and a fourth U winding 11u40 is located opposite the second U winding 11u20. The first U winding 11u10 is offset at an angle of 180° from the third U winding 11u30 and at an angle of 150° or 210° from the fourth U winding 11u40. Each U winding has winding connection points uij, distributed as follows: u11 and u12 for 11u10; u21 and u22 for 11u20; u31 and u32 for 11u30; and u41 and u42 for 11u40. This applies analogously to the V and W windings, which are not shown but can easily be imagined.

Figure 5:
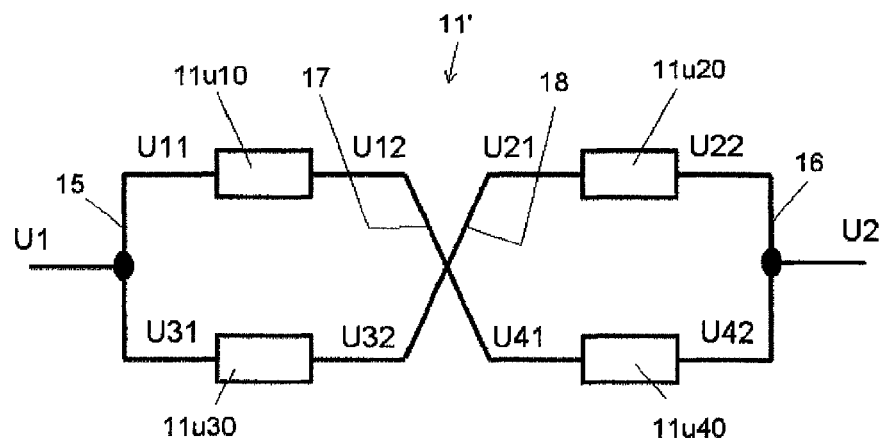
FIG. 5 is a circuit diagram of a winding phase of an electric machine according to the invention.

These windings 11u10 to 11u40 are connected in accordance with the circuit diagram of a U winding phase 11' of the electric machine 1 according to the invention according to FIG. 5. This applies analogously to the V and W windings.

FIG. 5 shows the U winding phase 11' as an example, said example also applying to a V winding phase 12' and a W winding phase 13'. Phase connection point u1 connects winding connection points u11 of U winding 11u10 and u31 of U winding 11u30 to a first parallel connection 15. Winding connection point u12 of U winding 11u10 is connected to winding connection point u41 of U winding 11u40 by a first cross-coupling 17. A second cross-coupling 18 connects winding connection point u32 of U winding 11u30 to winding connection point u21 of U winding 11u20. Finally, winding connection points u22 of U winding 11u20 and u42 of U winding 11u40 are connected to a second parallel connection 16 and connected to phase connection point u2.

In accordance with FIG. 5, two U windings respectively, namely 11u10 and 11u40 and 11u30 and 11u20, are connected in series by cross-couplings 17, 18. These series circuits 20 are themselves connected in parallel by parallel connections 15, 16. This produces a lower total resistance of U winding phase 11' than that of U winding phase 11 (see FIGS. 2 and 3) in the series circuit of all U windings 11u10 to 11u40.

Figure 6:
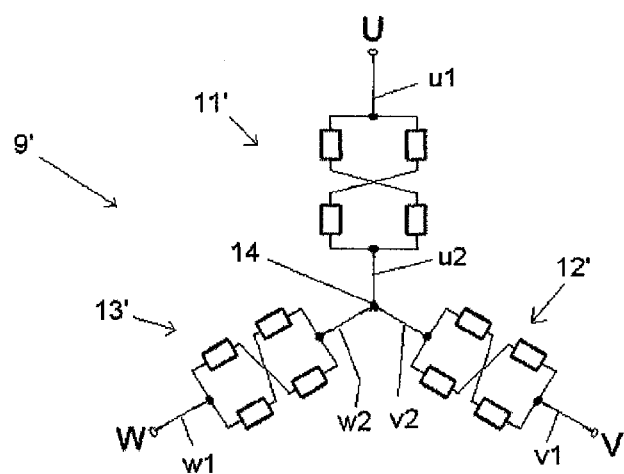
FIG. 6 is a circuit diagram of a star connection of the windings of the electric machine according to the invention.

FIG. 6 is a circuit diagram of a star connection 9' comprising winding phases 11', 12' and 13', the windings of which are connected as shown in FIG. 5.

Figure 7:
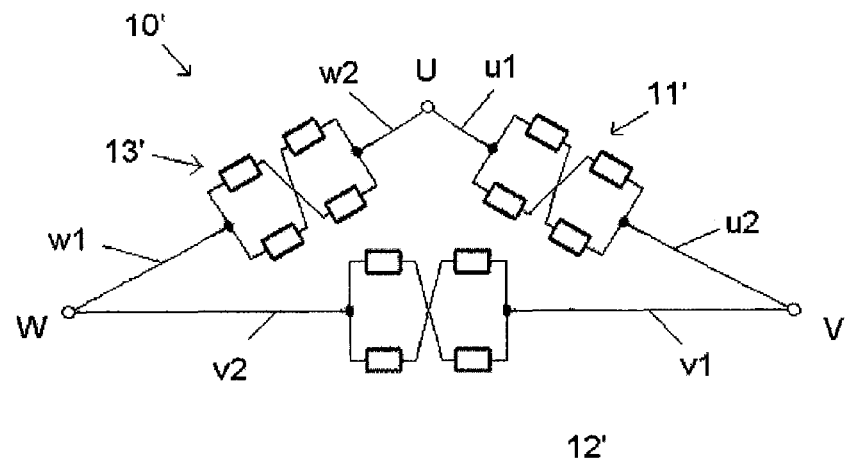
FIG. 7 is a circuit diagram of a delta connection of the windings of the electric machine.

A delta connection 10' comprising windings in accordance with FIG. 5 is illustrated in FIG. 7. The individual references of the individual windings and the winding connections of the winding phases 11', 12' and 13' are not stated. They emerge from FIG. 5, as described above.

By observing FIGS. 5 to 7 in conjunction with FIG. 4, it will be recognised that two opposite U windings (11u10 and 11u40 and 11u20 and 11u40), offset from each other at angles of 150° or 210°, of U winding phase 11' are connected in series. These opposing U windings 11u10 and 11u40, which are connected in series and offset from each other by 150° or 210°, are also connected in parallel to the opposite U windings 11u20 and 11u40 which are connected in series and offset from each other by 150° or 210°.

For example, an effect on phase symmetry in the case of eccentricity of the rotor 7 occurring in operation of the electric machine 1 (e.g. also occasioned by transverse moments) is significantly reduced. In the case of such eccentricity of the rotor 7, which, for example, acts to the right in FIG. 4, a gap between the outer surface of the rotor (see FIG. 1) and the teeth 4 is reduced, and the two U windings 11u10 and 11u20 are thus influenced more heavily than the opposite U windings 11u30 and 11u40, as the eccentricity of the rotor 7 produces a wider gap in this case. As the U windings 11u10 and 11u20 are now not connected in series, but are connected to an opposite U winding 11u30 and 11u40 respectively and are also connected in parallel, it emerges for the entire U winding phase 11' that the more powerful influences, e.g. induction of a higher voltage, in the two U windings 11u10 and 11u20 are compensated by the weaker influences, e.g. induction of a lower voltage of the other two U windings 11u30 and 11u40. This significantly improves the phase symmetry of the electric machine 1 and provides better phase compensation.

Figure 8:
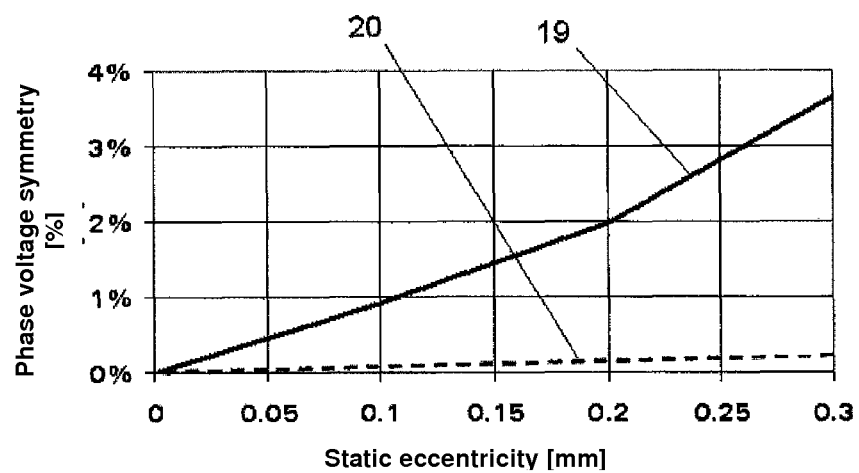
FIG. 8 is a graph of an effect of static eccentricity.

FIG. 8 provides a graphic illustration of an influence of static eccentricity on phase voltage symmetries. Phase voltage symmetry is plotted in percent over static eccentricity in mm. A continuous curve of a first winding connection 19 shows an increase of up to 3.8% at increasing static eccentricity up to 0.3 mm. The first winding connection 19 is part of the series circuit of winding phases 11, 12, 13 in accordance with FIGS. 2 and 3. The (almost) straight dashed line emerges from a second winding connection 20 for an embodiment of the winding phases 11', 12', 13' in accordance with FIGS. 5 to 7, the effect of the static eccentricity remaining below approximately 0.3% at a value of 0.3 mm.

Torque ripple, cogging torque and frictional torque are also reduced, particularly at high speeds of the electric machine 1. Phase resistance is also low.

Although the present invention has been described above using a preferred embodiment, it is not restricted thereto, but can be modified in any way without deviating from the subject of the present invention.

It may also be possible to use more than four windings per winding phase, for example six, eight, ten, etc. More than three winding phases can of course also be used.

An electric machine 1 having a stator 2 with fourteen teeth is also possible.

LIST OF REFERENCE SIGNS

1 Electric machine
2 Stator
3 Yoke
4 Tooth
5 Winding space
6 Rotor
7 Rotor axis
8 Magnet
9, 9' Star connection
10, 10' Delta connection
11, 11' U winding phase
11$u$10, 11$u$20, 11$u$30, 11$u$40 U windings
12, 12' V winding phase
12$v$10, 12$v$20, 12$v$30, 12$v$40 V windings
13, 13' W winding phase
13$w$10, 13$w$20, 13$w$30, 13$w$40 W windings
14 Star point
15 First parallel connection
16 Second parallel connection
17 First cross-coupling
18 Second cross-coupling
19 First winding connection
20 Second winding connection
N, S Magnet poles
ui, vi, wi Phase connection points
uij, vij, wij Winding connection points
U, V, W Machine connection points

The invention claimed is:

1. An electric machine having a rotor, having a stator which has a plurality of teeth, with winding phases provided on the teeth, wherein the stator and the rotor having a common central axis,
   wherein each winding phase has at least four windings, of which a first winding and a second winding are connected in series and are located on a first side and of which a third winding and a fourth winding are connected in series and located on a second side opposite the first side;
   wherein the first winding and the fourth winding are connected in series by a cross-couplings and the second winding and the third winding are connected in series by another cross-coupling and these series connections are themselves connected in parallel by parallel connections such that one parallel connection connects the first winding and the third winding, and the other parallel connection connects the second winding and the fourth winding,
   wherein the first winding and the third winding are located opposite to each other in the stator with respect to the central axis, and wherein the second winding and the fourth winding are located opposite to each other in the stator with respect to the central axis.

2. The machine according to claim 1, wherein the two windings which are located opposite each other in the stator and connected in series are offset from each other at angles of 150° or 210° in the stator.

3. The machine according to claim 1, wherein the number of teeth of the stator is twelve.

4. The machine according to claim 1, wherein the number of rotor poles is ten.

5. The machine according to claim 1, wherein the number of rotor poles is fourteen.

6. The machine according to claim 1, wherein the winding phases are interconnected in a star connection.

7. The machine according to claim 1, wherein the winding phases are interconnected in a delta connection.

8. The machine according to claim 1, wherein the electric machine is a brushless permanent magnet motor.

9. The machine according to claim 2, wherein the number of teeth of the stator is twelve.

10. The machine according to claim 2, wherein the number of rotor poles is ten.

11. The machine according to claim 2, wherein the number of rotor poles is fourteen.

12. The machine according to claim 2, wherein the winding phases are interconnected in a star connection.

13. The machine according to claim 2, wherein the winding phases are interconnected in a delta connection.

14. The machine according to claim 2, wherein the electric machine is a brushless permanent magnet motor.

15. A steering device of a motor vehicle which has an electric machine, having a rotor, having a stator which has a plurality of teeth, with winding phases provided on the teeth, wherein the stator and the rotor have a common central axis;
   wherein each winding phase has at least four windings of which a first winding and a second winding are connected in series and are located on a first side and of which a third winding and a fourth winding are connected in series and located on a second side opposite the first side;
   wherein the first winding and the fourth winding are connected in series by a cross-coupling and the second winding and the third winding are connected in series by another cross-coupling and these series connections are themselves connected in parallel by parallel connections such that one parallel connection connects the first winding and the third winding, and the other parallel connection connects the second winding and the fourth winding,
   wherein the first winding and the third winding are located opposite to each other in the stator with respect to the central axis, and wherein the second winding and the fourth winding are located opposite to each other in the stator with respect to the central axis.

* * * * *